United States Patent
Lin et al.

(10) Patent No.: US 9,853,889 B2
(45) Date of Patent: Dec. 26, 2017

(54) BROADCAST AND MULTICAST TRAFFIC REDUCTION IN STACKING SYSTEMS

(71) Applicant: Brocade Communications Systems, Inc., San Jose, CA (US)

(72) Inventors: Kwun-Nan Kevin Lin, Saratoga, CA (US); Shafiuddin Mohammed, Fremont, CA (US); Tao Guan, Cupertino, CA (US); Vishal Sinha, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 107 days.

(21) Appl. No.: 14/171,152

(22) Filed: Feb. 3, 2014

(65) Prior Publication Data

US 2014/0341080 A1 Nov. 20, 2014

Related U.S. Application Data

(60) Provisional application No. 61/825,449, filed on May 20, 2013.

(51) Int. Cl.
| | |
|---|---|
| *H04L 12/28* | (2006.01) |
| *H04L 12/753* | (2013.01) |
| *H04L 12/46* | (2006.01) |
| *H04L 12/18* | (2006.01) |
| *H04L 12/705* | (2013.01) |

(52) U.S. Cl.
CPC .......... *H04L 45/48* (2013.01); *H04L 12/1886* (2013.01); *H04L 12/4641* (2013.01); *H04L 45/18* (2013.01)

(58) Field of Classification Search
None
See application file for complete search history.

(56) References Cited

U.S. PATENT DOCUMENTS

| | | | |
|---|---|---|---|
| 4,625,308 A | 11/1986 | Kim et al. | |
| 5,481,073 A | 1/1996 | Singer et al. | |
| 5,651,003 A | 7/1997 | Pearce et al. | |

(Continued)

FOREIGN PATENT DOCUMENTS

| | | |
|---|---|---|
| CN | 1441580 A | 9/2003 |
| CN | 1791064 A | 6/2006 |

(Continued)

OTHER PUBLICATIONS

Amendment to Carrier Multiple Access with Collision Detection (CSMA/CD Access Method and Physical Layer Specifications—Aggregation of Multi[ple Link Segments; IEEE Std. 802.3ad; 2000; 183 pages.
Appeal Brief Dated Jan. 18, 2013; U.S. Appl. No. 12/463,964 (2120-04200) (23p.).
Brocade: "FastIron Ethernet Switch"; Administration Guide; Supporting FastIron Software Release 08.0.00; Apr. 30, 2013; 400 pages.
Brocade: "FastIron Ethernet Switch"; IP Multicast Configuration Guide; Supporting FastIron Software Release 08.0.00; Apr. 30, 2013; 212 pages.

(Continued)

*Primary Examiner* — Kwang B Yao
*Assistant Examiner* — Hardikkumar Patel
(74) *Attorney, Agent, or Firm* — Fountainhead Law Group P.C.

(57) ABSTRACT

Techniques for reducing broadcast and multicast traffic in a stacking system are provided. In one embodiment, a master device in the stacking system can automatically determine a minimal set of VLAN associations for stacking links in the stacking system. The minimal set of VLAN associations can avoid unnecessary transmission of broadcast or multicast packets through the system's topology.

20 Claims, 10 Drawing Sheets

(56) References Cited

U.S. PATENT DOCUMENTS

| | | |
|---|---|---|
| 5,727,170 A | 3/1998 | Mitchell et al. |
| 6,111,672 A | 8/2000 | Davis et al. |
| 6,243,756 B1 | 6/2001 | Whitmire et al. |
| 6,366,582 B1 | 4/2002 | Nishikado et al. |
| 6,373,840 B1 | 4/2002 | Chen |
| 6,490,276 B1 | 12/2002 | Salett et al. |
| 6,496,502 B1 | 12/2002 | Fite, Jr. et al. |
| 6,516,345 B1 | 2/2003 | Kracht |
| 6,526,345 B2 | 2/2003 | Ryoo |
| 6,597,658 B1 | 7/2003 | Simmons |
| 6,725,326 B1 | 4/2004 | Patra et al. |
| 6,765,877 B1 | 7/2004 | Foschiano et al. |
| 6,807,182 B1 | 10/2004 | Dolphin et al. |
| 6,839,342 B1 | 1/2005 | Parham et al. |
| 6,839,349 B2 | 1/2005 | Ambe et al. |
| 6,850,542 B2 | 2/2005 | Tzeng |
| 7,093,027 B1* | 8/2006 | Shabtay ............... H04L 12/4633 370/216 |
| 7,099,315 B2 | 8/2006 | Ambe et al. |
| 7,106,736 B2 | 9/2006 | Kalkunte |
| 7,136,289 B2 | 11/2006 | Vasavda et al. |
| 7,184,441 B1* | 2/2007 | Kadambi ............... H04L 12/46 370/400 |
| 7,206,283 B2 | 4/2007 | Chang et al. |
| 7,206,309 B2 | 4/2007 | Pegrum et al. |
| 7,274,694 B1 | 9/2007 | Cheng et al. |
| 7,313,667 B1 | 12/2007 | Pullela et al. |
| 7,327,727 B2 | 2/2008 | Rich et al. |
| 7,336,622 B1 | 2/2008 | Fallis et al. |
| 7,426,179 B1 | 9/2008 | Harshavardhana et al. |
| 7,480,258 B1 | 1/2009 | Shuen et al. |
| 7,496,096 B1 | 2/2009 | Dong et al. |
| 7,523,227 B1 | 4/2009 | Yager et al. |
| 7,561,527 B1 | 7/2009 | Katz et al. |
| 7,565,343 B2 | 7/2009 | Watanabe |
| 7,602,787 B2 | 10/2009 | Cheriton |
| 7,697,419 B1 | 4/2010 | Donthi |
| 7,933,282 B1 | 4/2011 | Gupta et al. |
| 7,962,595 B1 | 6/2011 | Jabbar |
| 8,209,457 B2 | 6/2012 | Engel et al. |
| 8,307,153 B2 | 11/2012 | Kishore |
| 8,750,144 B1 | 6/2014 | Zhou et al. |
| 8,949,574 B2 | 2/2015 | Slavin |
| 9,032,057 B2 | 5/2015 | Agarwal et al. |
| 9,038,151 B1 | 5/2015 | Chua et al. |
| 9,148,387 B2 | 9/2015 | Lin et al. |
| 9,185,049 B2 | 11/2015 | Agarwal et al. |
| 9,269,439 B1 | 2/2016 | Levy et al. |
| 9,282,058 B2 | 3/2016 | Lin et al. |
| 9,313,102 B2 | 4/2016 | Lin et al. |
| 9,559,897 B2 | 1/2017 | Lin et al. |
| 9,577,932 B2 | 2/2017 | Ravipati et al. |
| 9,628,408 B2* | 4/2017 | Janardhanan ........... H04L 49/15 |
| 9,660,937 B2 | 5/2017 | Agarwal et al. |
| 9,692,652 B2 | 6/2017 | Lin et al. |
| 9,692,695 B2 | 6/2017 | Lin et al. |
| 2001/0042062 A1 | 11/2001 | Tenev et al. |
| 2002/0046271 A1* | 4/2002 | Huang ............... H04L 45/00 709/223 |
| 2002/0101867 A1* | 8/2002 | O'Callaghan ....... H04L 12/4641 370/389 |
| 2003/0005149 A1 | 1/2003 | Haas et al. |
| 2003/0081556 A1 | 5/2003 | Woodall |
| 2003/0137983 A1 | 7/2003 | Song |
| 2003/0169734 A1 | 9/2003 | Lu et al. |
| 2003/0174719 A1* | 9/2003 | Sampath ............... H04L 45/48 370/402 |
| 2003/0182483 A1 | 9/2003 | Hawkins |
| 2003/0188065 A1 | 10/2003 | Golla et al. |
| 2005/0063354 A1 | 3/2005 | Garnett et al. |
| 2005/0141513 A1 | 6/2005 | Oh et al. |
| 2005/0198453 A1 | 9/2005 | Osaki |
| 2005/0243739 A1 | 11/2005 | Anderson et al. |
| 2005/0271044 A1 | 12/2005 | Hsu et al. |
| 2006/0013212 A1 | 1/2006 | Singh et al. |
| 2006/0023640 A1 | 2/2006 | Chang et al. |
| 2006/0072571 A1 | 4/2006 | Navada et al. |
| 2006/0077910 A1 | 4/2006 | Lundin et al. |
| 2006/0080498 A1 | 4/2006 | Shoham et al. |
| 2006/0092849 A1 | 5/2006 | Santoso et al. |
| 2006/0092853 A1 | 5/2006 | Santoso et al. |
| 2006/0114899 A1 | 6/2006 | Toumura et al. |
| 2006/0176721 A1 | 8/2006 | Kim et al. |
| 2006/0187900 A1 | 8/2006 | Akbar |
| 2006/0253557 A1 | 11/2006 | Talayco et al. |
| 2006/0280125 A1 | 12/2006 | Ramanan et al. |
| 2006/0294297 A1 | 12/2006 | Gupta |
| 2007/0081463 A1 | 4/2007 | Bohra et al. |
| 2007/0121673 A1 | 5/2007 | Hammer |
| 2007/0147271 A1 | 6/2007 | Nandy et al. |
| 2007/0174537 A1 | 7/2007 | Kao et al. |
| 2007/0291660 A1 | 12/2007 | Robson et al. |
| 2008/0137530 A1 | 6/2008 | Fallis et al. |
| 2008/0192754 A1 | 8/2008 | Ku et al. |
| 2008/0212497 A1 | 9/2008 | Getachew et al. |
| 2008/0259555 A1 | 10/2008 | Bechtolsheim et al. |
| 2008/0275975 A1 | 11/2008 | Pandey et al. |
| 2008/0281947 A1 | 11/2008 | Kumar |
| 2009/0125617 A1 | 5/2009 | Klessig et al. |
| 2009/0135715 A1 | 5/2009 | Bennah |
| 2009/0141641 A1 | 6/2009 | Akahane et al. |
| 2010/0172365 A1 | 7/2010 | Baird et al. |
| 2010/0182933 A1 | 7/2010 | Hu et al. |
| 2010/0185893 A1 | 7/2010 | Wang et al. |
| 2010/0257283 A1 | 10/2010 | Agarwal |
| 2010/0284414 A1* | 11/2010 | Agarwal ............... H04L 49/351 370/401 |
| 2010/0293200 A1 | 11/2010 | Assarpour |
| 2010/0329111 A1 | 12/2010 | Wan et al. |
| 2011/0092202 A1 | 4/2011 | Mattisson et al. |
| 2011/0142077 A1 | 6/2011 | Wong et al. |
| 2011/0238923 A1 | 9/2011 | Hooker et al. |
| 2011/0268123 A1 | 11/2011 | Kopelman et al. |
| 2011/0280258 A1 | 11/2011 | Klingen |
| 2012/0020373 A1 | 1/2012 | Subramanian et al. |
| 2012/0087232 A1 | 4/2012 | Hanabe et al. |
| 2012/0131123 A1* | 5/2012 | Yan ..................... H04L 49/55 709/208 |
| 2012/0155485 A1 | 6/2012 | Saha et al. |
| 2012/0246400 A1 | 9/2012 | Bhadra et al. |
| 2013/0170495 A1 | 7/2013 | Suzuki et al. |
| 2013/0201984 A1 | 8/2013 | Wang |
| 2013/0215791 A1 | 8/2013 | Lin et al. |
| 2013/0232193 A1 | 9/2013 | Ali et al. |
| 2013/0262377 A1 | 10/2013 | Agarwal |
| 2014/0003228 A1* | 1/2014 | Shah ..................... H04L 45/28 370/221 |
| 2014/0006706 A1 | 1/2014 | Wang |
| 2014/0071985 A1 | 3/2014 | Kompella et al. |
| 2014/0075108 A1 | 3/2014 | Dong et al. |
| 2014/0112190 A1 | 4/2014 | Chou et al. |
| 2014/0112192 A1 | 4/2014 | Chou et al. |
| 2014/0122791 A1 | 5/2014 | Fingerhut |
| 2014/0126354 A1 | 5/2014 | Hui et al. |
| 2014/0153573 A1 | 6/2014 | Ramesh et al. |
| 2014/0181275 A1 | 6/2014 | Lin et al. |
| 2014/0269402 A1 | 9/2014 | Vasseur et al. |
| 2014/0314082 A1 | 10/2014 | Korpinen et al. |
| 2014/0334494 A1 | 11/2014 | Lin et al. |
| 2014/0341079 A1 | 11/2014 | Lin et al. |
| 2014/0376361 A1 | 12/2014 | Hui et al. |
| 2015/0016277 A1 | 1/2015 | Smith et al. |
| 2015/0036479 A1 | 2/2015 | Gopalarathnam |
| 2015/0055452 A1 | 2/2015 | Lee |
| 2015/0117263 A1 | 4/2015 | Agarwal et al. |
| 2015/0124826 A1 | 5/2015 | Edsall et al. |
| 2015/0229565 A1 | 8/2015 | Ravipati et al. |
| 2015/0271861 A1 | 9/2015 | Li et al. |
| 2015/0281055 A1 | 10/2015 | Lin et al. |
| 2015/0288567 A1 | 10/2015 | Lin et al. |
| 2016/0021697 A1 | 1/2016 | Vargantwar et al. |

(56) References Cited

U.S. PATENT DOCUMENTS

| | | | |
|---|---|---|---|
| 2016/0028652 | A1 | 1/2016 | Agarwal et al. |
| 2016/0173332 | A1 | 6/2016 | Agarwal et al. |
| 2016/0173339 | A1 | 6/2016 | Lin et al. |

FOREIGN PATENT DOCUMENTS

| | | |
|---|---|---|
| CN | 101478435 A | 7/2009 |
| CN | 102684999 A | 9/2012 |
| EP | 2924927 A1 | 9/2015 |
| WO | 2015026950 A1 | 2/2015 |

OTHER PUBLICATIONS

Brocade: "FastIron Ethernet Switch"; Stacking Configuration Guide; Supporting FastIron Software Release 08.0.00; Apr. 30, 2013; 170 pages.
Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiners Answer Dated May 7, 2013; U.S. Appl. No. 12/463,964 (2120-4200) (12 p.) (Copy available via USPTO's IFW System).
Extreme Networks Technical Brief: "SummitStack Stacking Technology"; 1346_06; Dec. 2010; 8 pages.
Final Office Action Dated Jan. 23, 2012; U.S. Appl. No. 12/463,964 (2120-04200) (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.
Juniper Networks datasheet entitled: "Juniper Networks EX 4200 Ethernet Switches with Virtual Chassis Technology"; Dated Aug. 2013 (2120-04300) (12 p.).
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (2120-04200) (10 P.).
Partial International Search Report for PCT/US2014/051903 (119-006802WO) dated Nov. 18, 2014.
Reply Brief Dated Jul. 8, 2013; U.S. Appl. No. 12/463,964 (2120-04200) (14 p.).
Response to Office Action dated Mar. 21, 2011; U.S. Appl. No. 12/463,964; Response filed Sep. 21, 2011 (2120-04200) (12 p.).
Suckfuell: "Evolution of EWSD During the Eighties"; Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
U.S. Appl. No. 14/106,302, filed Dec. 13, 2013 by Lin et al.
U.S. Appl. No. 14/207,146, filed Mar. 12, 2014 by Lin et al.
U.S. Appl. No. 14/094,931, filed Dec. 3, 2013 by Lin et al.
U.S. Appl. No. 14/268,507, filed May 2, 2014 by Agarwal.
U.S. Appl. No. 14/463,419, filed Aug. 19, 2014 by Lee.
U.S. Appl. No. 14/485,343, filed Sep. 12, 2014 by Lin et al.
U.S. Appl. No. 14/506,943, filed Oct. 6, 2014 by Lin et al.
U.S. Appl. No. 14/530,193, filed Oct. 31, 2014 by Ravipati et al.
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
U.S. Appl. No. 61/974,924, filed Apr. 3, 2014 by Lin et al.
Extended European Search Report dated Jul. 30, 2015 for EP Appln. 15000834.0; 8 pages.
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Notice of Allowance dated Aug. 3, 2015; U.S. Appl. No. 14/207,146 (38 pgs.).
Notice of Allowance dated Sep. 17, 2015; U.S. Appl. No. 14/268,507 (15 pgs.).
U.S. Appl. No. 14/876,639, filed Oct. 6, 2015 by Agarwal et al.
Office Action dated Jul. 16, 2015; U.S. Appl. No. 14/094,931; (41 pgs.).
International Search Report and Written Opinion for International Appln. No. PCT/US2014/051903 dated Jan. 27, 2015, 16 pages.
Final Office Action dated Feb. 13, 2015; U.S. Appl. No. 13/850,118; (2120-04201) (14 p.).
Notice of Allowance dated Dec. 14, 2015; U.S. Appl. No. 14/094,931 (25 pgs.).
U.S. Appl. No. 14/869,743, filed Sep. 29, 2015 by Agarwal et al.
U.S. Appl. No. 62/092,617, filed Dec. 16, 2014 by Agarwal et al.
Office Action dated Feb. 18, 2016; U.S. Appl. No. 14/463,419; (74 pgs.).
Office Action dated Apr. 29, 2016; U.S. Appl. No. 14/485,343; (72 pgs.).
Final Office Action dated Jun. 3, 2016; U.S. Appl. No. 14/106,302; (35 pgs.).
Rooney et al: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.
NonFinal Office Action dated Jun. 23, 2016; U.S. Appl. No. 14/530,193; (73 pgs.).
NonFinal Office Action dated Jul. 13, 2016; U.S. Appl. No. 14/876,639; (69 pgs.).
Notice of Allowance dated Oct. 30, 2015; U.S. Appl. No. 13/850,118 (2120-04201) (12 pgs.).
Response to Office Action dated Jul. 16, 2015; U.S. Appl. No. 14/094,931; Response filed Nov. 12, 2015 (13 p.).
Office Action dated Nov. 20, 2015; U.S. Appl. No. 14/106,302; (14 pgs.).
Notice of Allowance dated Jan. 6, 2017; U.S. Appl. No. 14/530,193; (18 pgs.).
Notice of Allowance dated Feb. 8, 2017; U.S. Appl. No. 14/876,639; (25 pgs.).
Final Office Action dated Jan. 26, 2017; U.S. Appl. No. 14/463,419; (57 pgs.).
NonFinal Office Action dated Nov. 9, 2016; U.S. Appl. No. 14/506,943; (18 pgs.).

(56) References Cited

OTHER PUBLICATIONS

Notice of Allowance dated Oct. 13, 2016; U.S. Appl. No. 14/106,302; (23 pgs.).
Final Office Action dated Nov. 1, 2016; U.S. Appl. No. 14/485,343; (31 pgs.).
29-Chinese Office Action dated Jul. 24, 2017 Appln. No. 201510142392.X; 8 pages.
30-Pei et al.: Putting Routing Tables in Silicon, IEEE Network Magazine, Jan. 31, 1992, 9 pages.
31-Qingsheng et al.: Designing of Packet Processing Chip Routers, Aug. 31, 2001, China Academic Journal Electronic Publishing House, 4 pages (No English version).
32-Hsiao et al.: A High-Throughput and High-Capacity IPv6 Routing Lookup System, Nov. 16, 2012, Computer Networks, 13, pages.
NonFinal Office Action dated Jun. 15, 2017; U.S. Appl. No. 14/463,419; (35 pgs.).
Notice of Allowance dated Mar. 22, 2017; U.S. Appl. No. 14/506,943; (22 pgs.).
Notice of Allowance dated Apr. 13, 2017; U.S. Appl. No. 14/485,343; (25 pgs.).
NonFinal Office Action dated May 4, 2017; U.S. Appl. No. 15/051,601; (62 pgs.).
Chinese Office Action dated May 16, 2017 Appln. No. 201380065745.X.
Notice of Allowance dated Aug. 24, 2017; U.S. Appl. No. 15/051,601; (23 pgs.).
NonFinal Office Action dated Oct. 26, 2017; U.S. Appl. No. 14/869,743; (70 pgs.).

\* cited by examiner

BROADCAST AND MULTICAST TRAFFIC REDUCTION IN STACKING SYSTEMS

CROSS REFERENCES TO RELATED APPLICATIONS

The present application claims the benefit and priority under 35 U.S.C. 119(e) of U.S. Provisional Application No. 61/825,449, filed May 20, 2013, entitled "BROADCAST AND MULTICAST TRAFFIC REDUCTION BY VLAN ASSOCIATION IN A STACKING SYSTEM." The entire contents of this application are incorporated herein by reference for all purposes.

BACKGROUND

I. Stackable Devices and Stacking Systems

As known in the art, a "stackable device" is a network device (typically an L2/L3 switch) that can operate independently as a standalone device or in concert with one or more other stackable devices in a "stack" or "stacking system." FIG. 1A illustrates the front face of an exemplary stackable device 100 according to an embodiment. As shown, stackable device 100 includes a set of data ports 102, a set of stacking ports 104, and a console port 106. Data ports 102 are operable for connecting stackable device 100 to one or more hosts and/or data networks. Stacking ports 104 are operable for linking stackable device 100 (via "stacking links") to other devices in the same stacking system/topology. Unlike data ports 102, stacking ports 104 are considered internal ports (like a switching fabric in a chassis-based switch) and thus only forward packets within the stacking system. Stacking ports 104 can be dedicated ports (i.e., ports designed specifically for stacking) or high bandwidth data uplink ports that operate in a stacking mode. Console port 106 is operable for accessing the management console of stackable device 100 in order to perform various device management functions.

FIG. 1B illustrates an exemplary stacking system 120 according to an embodiment. As shown, stacking system 120 comprises a number of stackable devices 122, 124, and 126 (each similar to stackable device 100 of FIG. 1A) that have been linked together via their respective stacking ports. In the example of FIG. 1B, stackable devices 122, 124, and 126 form a ring topology. In addition, stackable device 124 is designated as the "master" device of stacking system 120, which means that stackable device 124 serves as the point of user contact for all management functions of system 120. For instance, stackable device 124 can accept and process user commands directed to the overall configuration of stacking system 120. Stackable device 124 can also communicate with non-master devices 122 and 126 as needed in order to propagate various types of management commands and data to those devices.

Most stacking systems in use today support linear or ring topologies, like the ring shown in FIG. 1B. However, advanced stacking systems, such as those implementing Brocade Communication Systems' "HyperEdge" technology, can support general mesh-like topologies (e.g., star, tree, partial mesh, full mesh, etc.), which allow for improved resiliency and shorter latency. Advanced stacking systems can also mix high-end and low-end stackable devices in a single topology. For example, FIG. 1C depicts an advanced stacking system 140 comprising a combination of high-end devices 142-148 and low-end devices 150-156 that are interconnected in the form of a partial mesh. In this example, the stacking ports of high-end devices 142-148 support higher data throughput than the stacking ports of low-end devices 150-156. For instance, the stacking ports of high-end devices 142-148 may be 100G ports, while the stacking ports of low-end devices 150-156 may be 10G or 40G ports. Accordingly, the stacking links directly interconnecting high-end devices 142-148 to each other (as shown by heavy lines) have higher bandwidth than the stacking links directly interconnecting low-end devices 150-156 to each other or to high-end devices 142-148 (as shown by light lines).

II. Broadcast/Multicast Packet Switching in Stacking Systems

Generally speaking, the data packets that are switched/forwarded by a stacking system can be classified into three types based on their respective destinations: (1) unicast, (2) broadcast, and (3) multicast. A unicast packet is directed to a single destination. Thus, when a unicast packet is received at an ingress data port of a stacking system, the unicast packet need only be switched through the stacking ports needed to deliver the packet to a single egress data port (of a single stackable device) in the system.

On the other hand, broadcast and multicast packets are directed to multiple destinations; in particular, a broadcast packet is directed to all nodes in the packet's VLAN, while a multicast packet is directed to certain, selective nodes (comprising a multicast group) in the packet's VLAN. Thus, when a broadcast or multicast packet is received at an ingress data port of a stacking system, the broadcast/multicast packet must generally reach, or be capable of reaching, every stackable device in the system that has egress data ports in (i.e., are members of) the packet's VLAN.

This gives rise to two potential problems. First, if an incoming broadcast/multicast packet is simply flooded throughout a stacking system (i.e., replicated to each stacking port) so that it can reach every stackable device in the system, the flooded packets may endlessly loop through the system's topology (assuming the topology is a ring or a mesh with looping paths). Fortunately, it is possible to avoid packet looping by implementing a feature known as "egress source ID filtering." With this feature, each ingress packet is tagged with a source ID that identifies the stackable device on which the packet was received. In addition, a set of single-source spanning trees originating from each stackable device is calculated. The single-source spanning trees are then used to filter packets at the system's stacking ports in a manner that ensures a packet with a particular source ID is only switched along the paths of its corresponding tree. This effectively eliminates packet looping, while allowing each stackable device to be reachable from every other device in the system.

The second problem is that, even with egress source ID filtering in place, a broadcast/multicast packet may still be replicated to stackable devices in the system that do not need to receive the packet (i.e., do not have any data ports in the packet's VLAN). To better understand this, note that a data packet is generally received at an ingress data port of a stacking system, forwarded through the system's stacking ports, and then output via one or more egress data ports. In order for the packet to be allowed through the data and stacking ports in this forwarding path, each data/stacking port must be associated with (i.e., considered "in") the packet's VLAN (via a "VLAN association"). For example, if the packet reaches a stackable device in the system via an input port (either data or stacking) that is not in the packet's VLAN, the packet will be dropped. Similarly, if a stackable device attempts to send out the packet via an output port (either data or stacking) that is not in the packet's VLAN, the transmission will be blocked.

However, with current stacking implementations, it is difficult to determine the appropriate VLAN associations for every stacking port in a complicated topology. For instance, a stackable device that has no data ports in a particular VLAN may still need to bridge that VLAN via one or more of its stacking ports for a stackable device that is several hops away. Thus, the common practice is to associate every possible VLAN to every stacking port in the system. This will cause an incoming broadcast/multicast packet to be replicated to every stacking port regardless of the packet's VLAN (as long as it is not blocked by egress source ID filtering), and thus result in transmission of the broadcast/ multicast packet to every stackable device in the system, even if certain devices do not need it.

The foregoing practice wastes stacking port bandwidth, which can be particularly problematic in large stacking systems, or advanced stacking systems that have stacking ports/links of differing bandwidths. For example, in advanced stacking system 140 of FIG. 1C, unnecessary broadcast/multicast traffic can quickly saturate the links interconnecting low-end devices 150-156 to each other (and to high-end devices 142-148) due to their relatively low bandwidth capacities.

SUMMARY

Techniques for reducing broadcast and multicast traffic in a stacking system are provided. In one embodiment, a master device in the stacking system can automatically determine a minimal set of VLAN associations for stacking links in the stacking system. The minimal set of VLAN associations can avoid unnecessary transmission of broadcast or multicast packets through the system's topology.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for reducing broadcast and multicast traffic within a stacking system. At a high level, a master device of the stacking system can automatically determine a minimal set of VLAN associations for the stacking links in the system, where the minimal set of VLAN associations minimize or eliminate "unnecessary" transmission of broadcast/multicast packets through the system's topology (i.e., the transmission of broadcast/ multicast packets to stackable devices that do not have any data ports in the packets' VLANs). In one embodiment, the determination of the minimal set of VLAN associations can be based on a complete set of single-source spanning trees that are calculated in view of the topology. The master device can then cause VLANs to be assigned to stacking ports in the stacking system in accordance with the minimal set of VLAN associations.

With these techniques, the amount of broadcast and multicast traffic flowing through the system can be substantially reduced in comparison to existing practices/implementations (which typically involve associating all VLANs to all stacking ports). This, in turn, can avoid link saturation in large stacking systems, or advanced stacking systems that mix high bandwidth and low bandwidth stacking ports/links. Further, the algorithm for determining the minimal set of VLAN associations is not limited to certain types of topologies, and instead can apply to any general, mesh-like topology. The details of this algorithm are described in the sections that follow.

Figure 2:
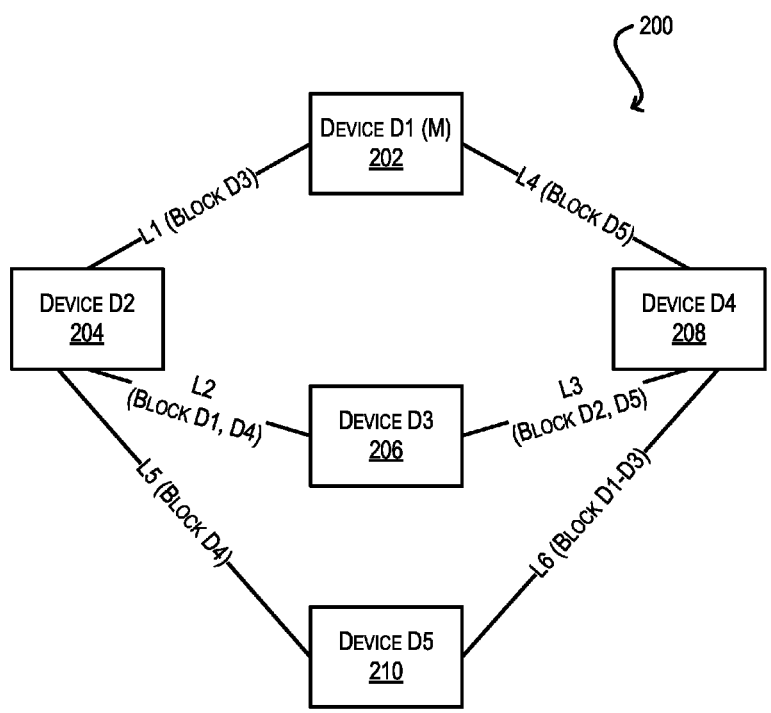
FIG. 2 depicts a stacking system with egress source ID filtering enabled according to an embodiment.

FIG. 2 depicts a stacking system 200 in which embodiments of the present invention may be implemented. As shown, stacking system 200 includes a number of stackable devices D1-D5 (identified by reference numerals 202-210) that are interconnected via stacking links L1-L6 according to a mesh-like topology. Device D1 is the master device. Although five stackable devices are depicted, it should be appreciated that any number of such devices may be supported. Further, although there is no explicit differentiation between stackable devices D1-D5, one or more of devices D1-D5 may be high-end devices (with, e.g., high bandwidth stacking ports), and one or more of devices D1-D5 may be low-end devices (with, e.g., low bandwidth stacking ports).

In the example of FIG. 2, stacking system 200 implements egress source ID filtering. As a result, the stacking ports at the ends of links L1-L6 have been configured to block packets with source IDs in a "filter list" that is specific to each link. For instance, the stacking ports at the ends of link L1 have been configured to block packets with a source ID corresponding to device D3, the stacking ports at the ends of link L2 have been configured to block packets with source IDs corresponding to devices D1 and D4, the stacking ports at the ends of link L3 have been configured to block packets with source IDs corresponding to devices D2 and D5, and so on.

The particular filter lists shown in FIG. 2 are based on a complete set of single-source spanning trees for the topology of stacking system 200 as depicted in FIGS. 3A-3E (i.e., trees 300, 310, 320, 330, and 340). Each single-source spanning tree in FIGS. 3A-3E has, at its root, one stackable device of stacking system 200. For example, the root of tree 300 is device D1, the root of tree 310 is device D2, the root of tree 320 is device D3, the root of tree 330 is device D4, and the root of tree 340 is device D5. In addition, each single-source spanning tree in FIGS. 3A-3E defines a non-looping path from the root to every other device in stacking system 200. Thus, by creating the filter lists in FIG. 2 based on these trees, stacking system 200 can ensure that packet looping is avoided when forwarding broadcast/multicast packets.

It should be noted that trees 300-340 of FIGS. 3A-3E merely represent one possible set of single-source spanning trees for the topology of stacking system 200, and that other sets of trees may also be used. Different types of spanning tree algorithms will produce different sets of spanning trees, with potentially different properties. For example, if a shortest path algorithm is used, the resulting trees will define the shortest paths between any two nodes/devices.

As discussed in the Background section, one problem with switching broadcast/multicast traffic in a conventional stacking system is that, even with egress source ID filtering in place, there may be a significant number broadcast/multicast packets that are forwarded to stackable devices in the system that do not require them (i.e., stackable devices that do not have any data ports in the packets' VLANs). This is due to the common practice of associating every possible VLAN with every stacking port (for simplicity of configuration, and to ensure that each stackable device receives packets for VLANs of which the device has member data ports).

For example, with respect to FIG. 2, assume that a broadcast/multicast packet tagged with VLAN ID 10 is received at an ingress data port of stackable device D1. Further assume that stackable device D3 has data ports in VLAN 10, but stackable devices D2, D4, and D5 do not. In this scenario, if VLAN 10 is associated with every stacking port (in accordance with the common practice noted above), the broadcast/multicast packet will be propagated from source device D1 to all remaining devices D2-D5 (per the links in single-source spanning tree 300 of FIG. 3A), even though devices D3 and D4 are the only devices that need it (D3 has data ports in VLAN 10, and D4 must bridge VLAN 10 packets from D1 to D3). This results in wasted stacking port bandwidth, and can possibly reduce overall system performance if enough excess traffic is generated.

To address the foregoing and other similar issues, in various embodiments master device D1 can execute a novel algorithm that determines a minimal set of VLAN associations for the stacking links of system 200. As described previously, the minimal set of VLAN associations can define VLAN associations that prevent unnecessary broadcast/multicast packets from being passed through the stacking ports (ether in or out), thereby reducing the total amount of broadcast/multicast traffic in the system. Significantly, the algorithm can work with any mesh-like topology (e.g., linear, ring, star, tree, partial mesh, full mesh, etc.), and thus is not limited to simple linear or ring topologies.

In one embodiment, the algorithm can take as input a complete set of single-source spanning trees for a stacking system's topology (e.g., trees 300-340 of FIGS. 3A-3E), and can apply the following two rules to each tree:

1. If the root device and a non-root device of the single-source spanning tree have data ports in common VLANs, create VLAN associations between the common VLANs and each stacking link in the path between the root device and the non-root device in the tree; and
2. If the root device and a non-root device of the single-source spanning tree do not have any data ports in common VLANs, do not create any (new) VLAN associations for the stacking links in the path between the root device and the non-root device in the tree.

With these rules, the algorithm can selectively associate VLANs to stacking ports in a manner that guarantees broadcast/multicast packets are propagated to downstream devices that need the packets (i.e., share common VLANs with the ingress device), while preventing broadcast/multicast packets from being propagated to downstream devices that do not need the packets (i.e., do not share any common VLANs with the ingress device).

Figure 4:
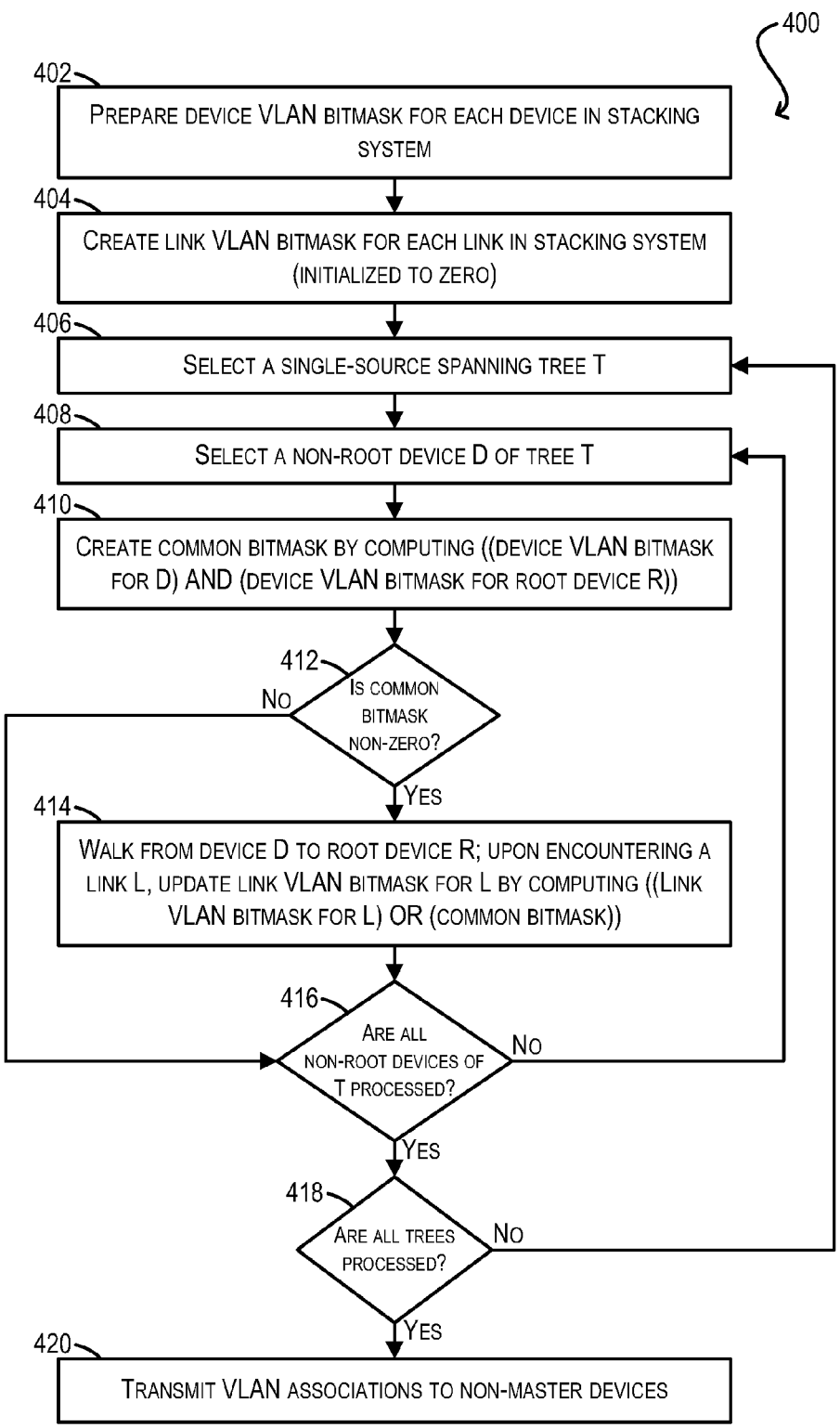
FIG. 4 depicts an algorithm for determining a minimal set of VLAN associations according to an embodiment.

FIG. 4 depicts a detailed flowchart 400 of the VLAN association algorithm discussed above according to an embodiment. For purposes of illustration, flowchart 400 is described as being performed by master device D1 in the context of stacking system 200. Further, flowchart 400 assumes that master device D1 (or some other device) has already computed a complete set of single-source spanning trees based on the topology of system 200. For example, the set of single-source spanning trees may be the same trees used by stacking system 200 for egress source ID filtering.

At block 402, master device D1 can prepare a "device VLAN bitmask" for every stackable device in stacking system 200. Each device VLAN bitmask is a string of bits that represents the VLANs of which the device's data ports are members (each bit corresponds to a VLAN number). Generally speaking, there may be up to 4096 VLANs defined. Accordingly, the bitmask can comprise up to 4096 bits (512 bytes or 128 words). A bit set to 1 indicates that the stackable device has at least one data port in the corresponding VLAN. For example, if bit 123 is set to 1, the device has one or more data ports in VLAN 123. A bit set to 0 indicates that the stackable device does not have any data ports in the corresponding VLAN.

At block 404, master device D1 can prepare a "link VLAN bitmask" for every stacking link in stacking system 200. Each link VLAN bitmask is a string of bits that represents the calculated VLAN associations for the stacking ports comprising the stacking links. Like the device VLAN bitmasks, the link VLAN bitmasks can comprise up to 4096 bits (one bit per VLAN number). At this point in the algorithm, each link VLAN bitmask is initialized to zero.

Once the device VLAN bitmasks and link VLAN bitmasks are created, master device D1 can select a single-source spanning tree T in the set of computed single-source spanning trees (block 406). Master device D1 can then select a particular non-root device D in tree T (block 408), and create a "common bitmask" that is the result of performing a logical AND on the device VLAN bitmask for D and the device VLAN bitmask for the root device R of tree T (block 410). The common bitmask represents the VLANs that non-root device D and root device R have in common.

If the common bitmask created at block 410 is non-zero (i.e., contains any "1" bits) (block 412), master device D1 can walk up tree T from non-root device D to root device R (block 414). As part of this process, master device D1 can update the link VLAN bitmask for every stacking link L along the traversed path by performing a logical OR on the link VLAN bitmask for L and the common bitmask. This effectively adds the VLANs identified in the common bitmask to the link VLAN bitmask. On the other hand, if the common bitmask is determined to be zero at block 412, master device D1 can skip the processing of block 414.

At block 416, master device D1 can check whether all of the non-root devices in tree T have been processed. If not, master device D1 can return to block 408 in order to process the unprocessed devices.

If all of the non-root devices have been processed, master device D1 can further check whether all of the single-source spanning trees have been processed (block 418). If not, master device D1 can return to block 406 in order to process the unprocessed trees.

Finally, if all of the single-source spanning trees have been processed, master device D1 can conclude that the algorithm is complete and the minimal set of VLAN associations has been calculated (in the form of the link VLAN bitmasks). In response, master device D1 can transmit the calculated VLAN associations to the non-master devices (D2-D5) of system 200 (block 420). Each device can subsequently configure and enforce the VLAN associations at the stacking ports of the device.

The algorithm shown in FIG. 4 has a time complexity of $O(N^2 \log N)$, where N is the number of stackable devices in the stacking system (and the average spanning tree depth is assumed to be log N). Since N is typically small, the resources/time needed to execute the algorithm should not be significant. In addition, the device and link VLAN bitmasks can be manipulated in the form of words (e.g., 128 words per bitmask) rather than bits or bytes, thereby further optimizing the process.

Although not shown in the FIG. 4, master device D1 can re-execute the algorithm (and thus recalculate the VLAN associations) whenever there are topology or VLAN changes to stacking system 200. In the case of a topology change, master device D1 typically must also re-compute the single-source spanning trees. Generally speaking, topology changes should be infrequent, so this should not be a significant burden.

Depending on the environment, VLAN changes (i.e., changes to the VLANs of which a given stackable device's data ports are members) may occur more frequently. If such VLAN changes occur very often (e.g., more than 10 times a second), in certain embodiments master device D1 can implement measures to reduce the need to constantly re-execute the algorithm. For example, in one embodiment, master device D1 can aggregate multiple VLAN changes and trigger re-execution of the algorithm at a set interval (taking into account all the changes that occurred during that interval). This approach may delay correct broadcast/multicast forwarding until the re-execution is complete.

In another embodiment, master device D1 can associate a VLAN to all stacking ports of system 200 if the VLAN is added to any device in the system. Nothing is done if a VLAN is removed. This approach will not prevent stacking system 200 from correctly forwarding broadcast/multicast packets, but it may result in some redundant/unnecessary flooding of packets. Master device D1 can subsequently trigger the algorithm at a later point in time to calculate the minimal set of VLAN associations and thus trim down the unnecessary flooding.

As noted with respect to FIG. 2, the single-source spanning trees that are created for a given topology will differ depending on the spanning tree algorithm that is used. The algorithm shown in FIG. 4 is compatible with different sets of trees, as long as the sets are complete; however, different sets of trees may result in different sets of minimal VLAN associations. If the spanning trees in a given set have a greater number of "two-way" paths (i.e., the path from device A to device B is the same as the path from B to A), the number of VLAN associations can be reduced. Thus, when the single-source spanning trees are calculated, it may be advantageous to maximize the number of two-way paths by selecting existing reversed paths during, e.g., equal-cost path handling.

To further clarify the operation of the algorithm of FIG. 4, the following sections illustrate an exemplary application of the algorithm to the specific system topology and single-source spanning trees depicted in FIGS. 2 and 3A-3E. In this example, assume that there are four VLANs in stacking system 200: V1, V2, V3, and V4. In addition, assume that the data ports of stackable devices D1-D5 are assigned to VLANs per Table 1 below (resulting in the device VLAN bitmasks shown in the last column). In the device VLAN bitmasks (as well as all other bitmasks in this example), the rightmost bit corresponds to VLAN 1.

TABLE 1

| Device | V4 | V3 | V2 | V1 | Device VLAN bitmask |
|---|---|---|---|---|---|
| D1 | X |   |   | X | 1001 |
| D2 |   | X | X |   | 0110 |
| D3 |   |   |   | X | 0001 |
| D4 |   | X |   | X | 0101 |
| D5 | X | X |   |   | 1100 |

Once the device VLAN bitmasks are created (and the link VLAN bitmasks are initialized), master device D1 will process the single-source spanning trees and the non-root devices in each tree according to blocks 406-418 of FIG. 4. Assume that master device D1 begins with tree 300 of FIG. 3A that is rooted at device D1. Master device D1 will process non-root devices D2, D3, D4, and D5 as follows:

D2: Common bitmask=D1 VLAN bitmask (1001) AND D2 VLAN bitmask (0110)=0; thus, do nothing D3: Common bitmask=D1 VLAN bitmask (1001) AND D3 VLAN bitmask (0001)=0001; thus, walk up to root D1
  Link L3 (D3→D4): L3 VLAN bitmask=L3 VLAN bitmask (0000) OR common bitmask (0001)=0001
  Link L4 (D4→D1): L4 VLAN bitmask=L4 VLAN bitmask (0000) OR common bitmask (0001)=0001

D4: Common bitmask=D1 VLAN bitmask (1001) AND D4 VLAN bitmask (0101)=0001; thus, walk up to root D1
  Link L4 (D4→D1): L4 VLAN bitmask=L4 VLAN bitmask (0001) OR common bitmask (0001)=0001

D5: Common bitmask=D1 VLAN bitmask (1001) AND D5 VLAN bitmask (1100)=1000; thus, walk up to root D1
  Link L5 (D5→D2): L5 VLAN bitmask=L5 VLAN bitmask (0000) OR common bitmask (1000)=1000
  Link L1 (D2→D1): L1 VLAN bitmask=L1 VLAN bitmask (0000) OR common bitmask (1000)=1000

Table 2 below shows the values of the link VLAN bitmasks for links L1-L6 after the processing of tree 300:

TABLE 2

| | L1 bitmask | L2 bitmask | L3 bitmask | L4 bitmask | L5 bitmask | L6 bitmask |
|---|---|---|---|---|---|---|
| Value | 1000 | 0000 | 0001 | 0001 | 1000 | 0000 |

Figure 3A:
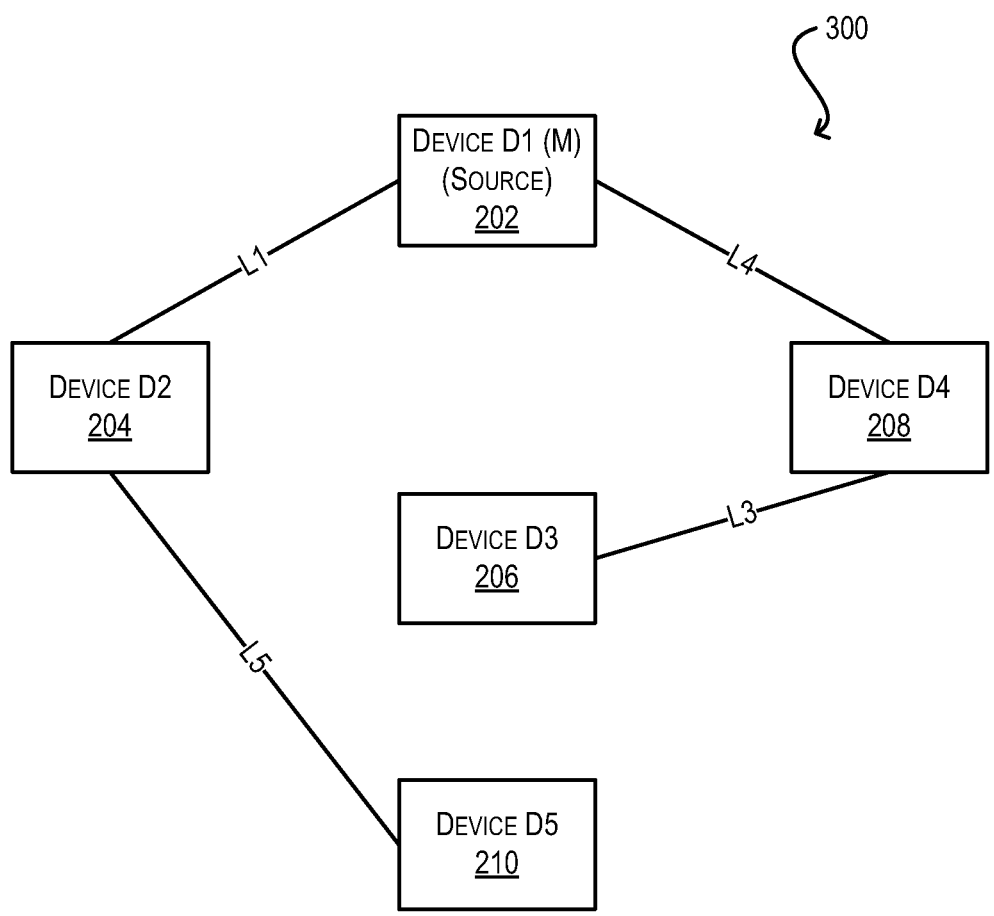
FIGS. 3A-3E depict a set of single-source spanning trees for the stacking system of FIG. 2 according to an embodiment.
Figure 3B:
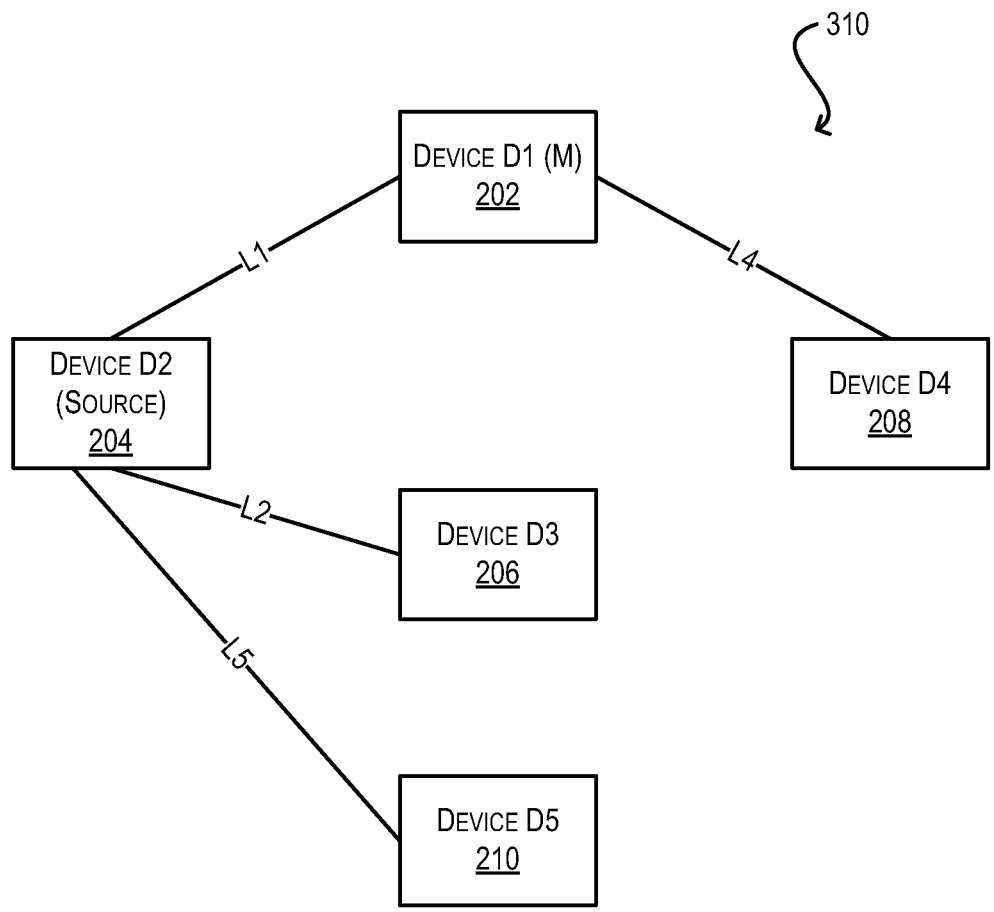

Next, assume that master device D1 processes tree 310 of FIG. 3B that is rooted at device D2. Master device D1 will process non-root devices D1, D3, D4, and D5 as follows:

D1: Common bitmask=D2 VLAN bitmask (0110) AND D1 VLAN bitmask (1001)=0; thus, do nothing D3: Common bitmask=D2 VLAN bitmask (0110) AND D3 VLAN bitmask (0001)=0; thus, do nothing D4: Common bitmask=D2 VLAN bitmask (0110) AND D4 VLAN bitmask (0101)=0100; thus, walk up to root D2
  Link L4 (D4→D1): L4 VLAN bitmask=L4 VLAN bitmask (0001) OR common bitmask (0100)=0101
  Link L1 (D1→D2): L1 VLAN bitmask=L1 VLAN bitmask (1000) OR common bitmask (0100)=1100

D5: Common bitmask=D2 VLAN bitmask (0110) AND D5 VLAN bitmask (1100)=0100; thus, walk up to root D2
  Link L5 (D5→D2): L5 VLAN bitmask=L5 VLAN bitmask (1000) OR common bitmask (0100)=1100

Table 3 below shows the values of the link VLAN bitmasks for links L1-L6 after the processing of tree 310:

TABLE 3

|  | L1 bitmask | L2 bitmask | L3 bitmask | L4 bitmask | L5 bitmask | L6 bitmask |
|---|---|---|---|---|---|---|
| Value | 1100 | 0000 | 0001 | 0101 | 1100 | 0000 |

Figure 3C:
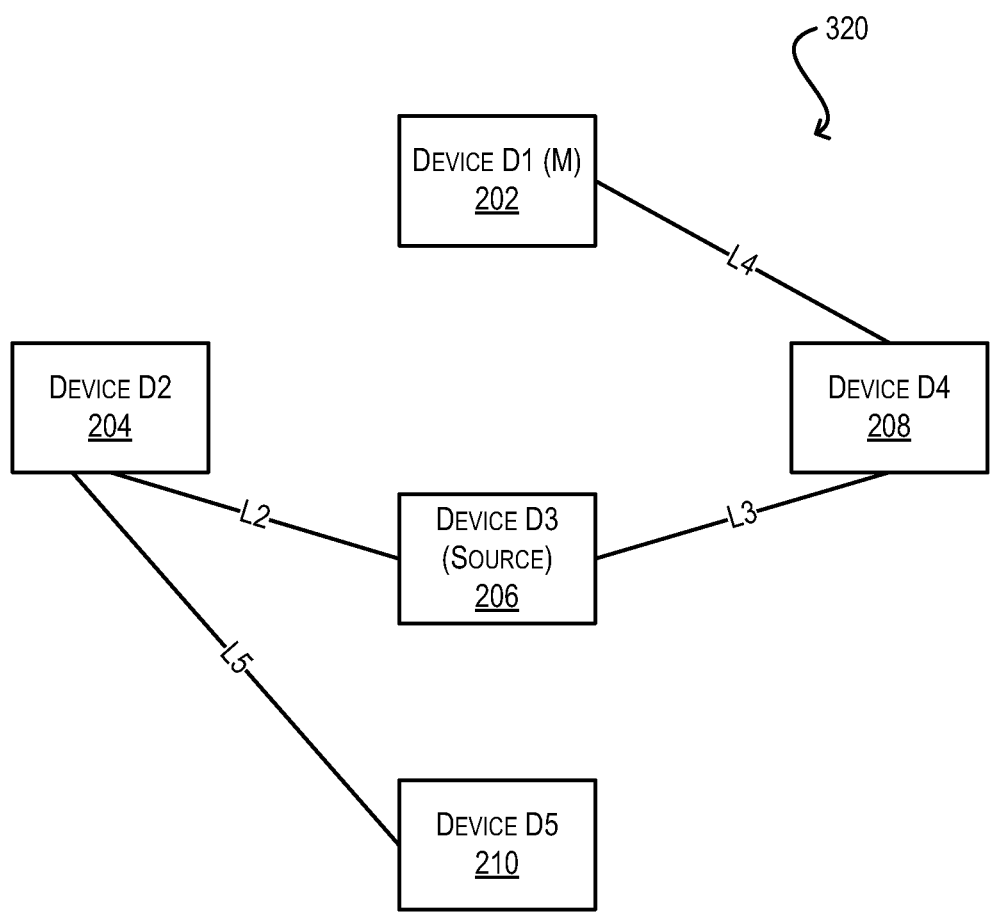

Next, assume that master device D1 processes tree 320 of FIG. 3C that is rooted at device D3. Master device D1 will process non-root devices D1, D2, D4, and D5 as follows:

D1: Common bitmask=D3 VLAN bitmask (0001) AND D1 VLAN bitmask (1001)=0001; thus, walk up to root D3
  Link L4 (D1→D4): L4 VLAN bitmask=L4 VLAN bitmask (0101) OR common bitmask (0001)=0101
  Link L3 (D4→D3): L3 VLAN bitmask=L3 VLAN bitmask (0001) OR common bitmask (0001)=0001
D2: Common bitmask=D3 VLAN bitmask (0001) AND D2 VLAN bitmask (0110)=0; thus, do nothing
D4: Common bitmask=D3 VLAN bitmask (0001) AND D4 VLAN bitmask (0101)=0001; thus, walk up to root D3
  Link L3 (D4→D3): L3 VLAN bitmask=L3 VLAN bitmask (0001) OR common bitmask (0001)=0001
D5: Common bitmask=D3 VLAN bitmask (0001) AND D5 VLAN bitmask (1100)=0; thus, do nothing Table 4 below shows the values of the link VLAN bitmasks for links L1-L6 after the processing of tree 320:

TABLE 4

|  | L1 bitmask | L2 bitmask | L3 bitmask | L4 bitmask | L5 bitmask | L6 bitmask |
|---|---|---|---|---|---|---|
| Value | 1100 | 0000 | 0001 | 0101 | 1100 | 0000 |

Figure 3D:
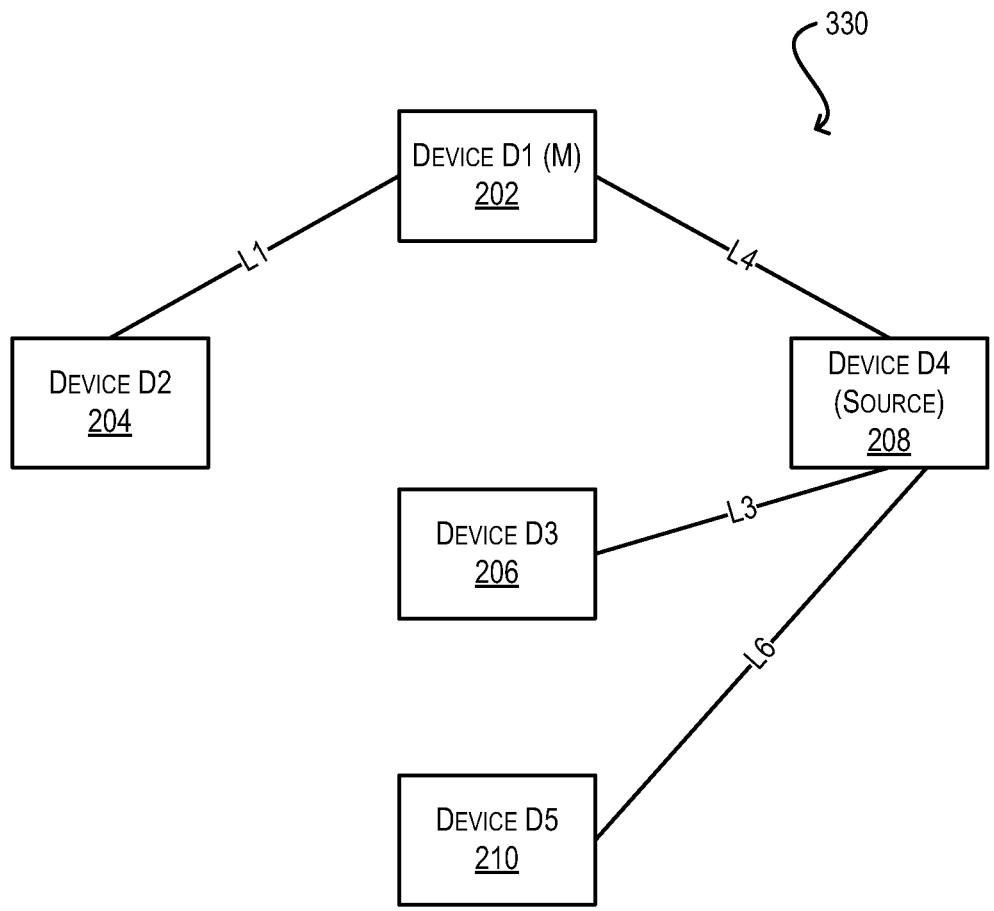

Next, assume that master device D1 processes tree 330 of FIG. 3D that is rooted at device D4. Master device D1 will process non-root devices D1, D2, D3, and D5 as follows:

D1: Common bitmask=D4 VLAN bitmask (0101) AND D1 VLAN bitmask (1001)=0001; thus, walk up to root D4
  Link L4 (D1→D4): L4 VLAN bitmask=L4 VLAN bitmask (0101) OR common bitmask (0001)=0101
D2: Common bitmask=D4 VLAN bitmask (0101) AND D2 VLAN bitmask (0110)=0100; thus, walk up to root D4
  Link L1 (D2→D1): L1 VLAN bitmask=L1 VLAN bitmask (1100) OR common bitmask (0100)=1100
  Link L4 (D1→D4): L4 VLAN bitmask=L4 VLAN bitmask (0101) OR common bitmask (0100)=0101
D3: Common bitmask=D4 VLAN bitmask (0101) AND D3 VLAN bitmask (0001)=0001; thus, walk up to root D4
  Link L3 (D3→D4): L3 VLAN bitmask=L3 VLAN bitmask (0001) OR common bitmask (0001)=0001
D5: Common bitmask=D4 VLAN bitmask (0101) AND D5 VLAN bitmask (1100)=0100; thus, walk up to root D4
  Link L6 (D5→D4): L6 VLAN bitmask=L6 VLAN bitmask (0000) OR common bitmask (0100)=0100

Table 5 below shows the values of the link VLAN bitmasks for links L1-L6 after the processing of tree 330:

TABLE 5

|  | L1 bitmask | L2 bitmask | L3 bitmask | L4 bitmask | L5 bitmask | L6 bitmask |
|---|---|---|---|---|---|---|
| Value | 1100 | 0000 | 0001 | 0101 | 1100 | 0100 |

Figure 3E:
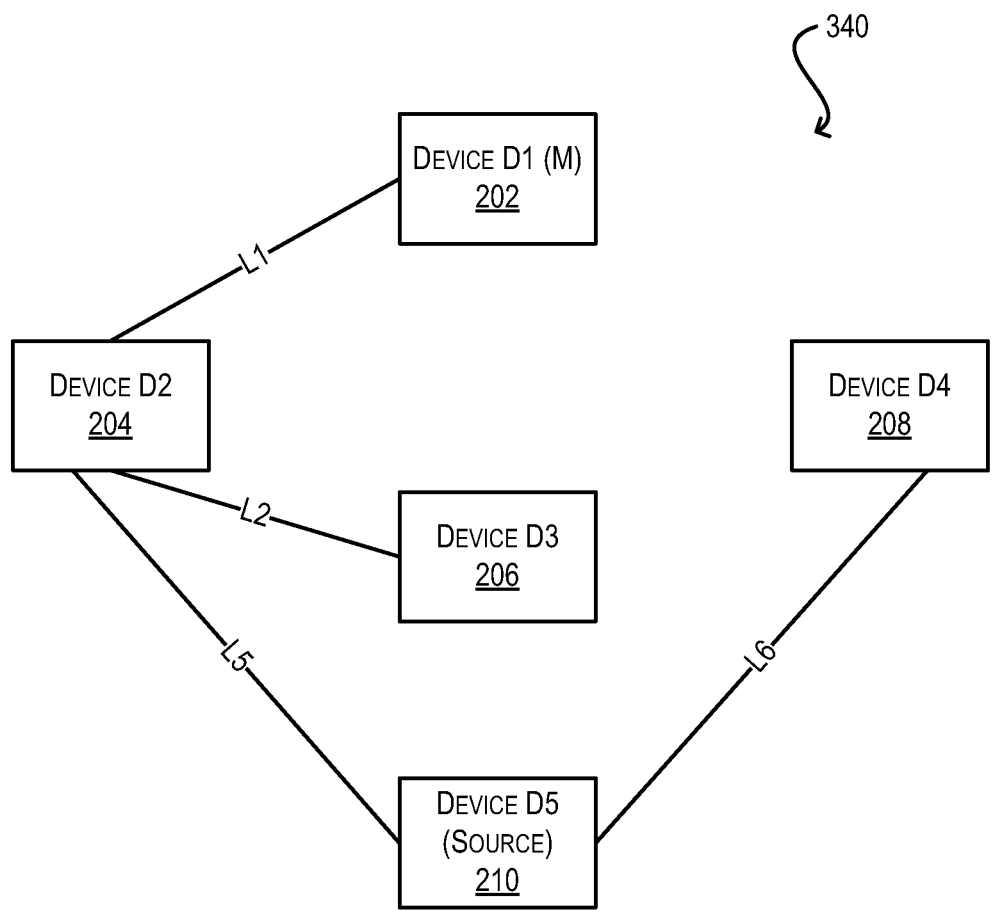

Finally, assume that master device D1 processes tree 340 of FIG. 3E that is rooted at device D5. Master device D1 will process non-root devices D1, D2, D3, and D4 as follows:

D1: Common bitmask=D5 VLAN bitmask (1100) AND D1 VLAN bitmask (1001)=1000; thus, walk up to root D5
  Link L1 (D1→D2): L1 VLAN bitmask=L1 VLAN bitmask (1100) OR common bitmask (1000)=1100
  Link L5 (D2→D5): L5 VLAN bitmask=L5 VLAN bitmask (1100) OR common bitmask (1000)=1100
D2: Common bitmask=D5 VLAN bitmask (1100) AND D2 VLAN bitmask (0110)=0100; thus, walk up to root D5
  Link L5 (D2→D5): L5 VLAN bitmask=L5 VLAN bitmask (1100) OR common bitmask (0100)=1100
D3: Common bitmask=D5 VLAN bitmask (1100) AND D3 VLAN bitmask (0001)=0; thus, do nothing
D4: Common bitmask=D5 VLAN bitmask (1100) AND D4 VLAN bitmask (0101)=0100; thus, walk up to root D5
  Link L6 (D4→D5): L6 VLAN bitmask=L6 VLAN bitmask (0100) OR common bitmask (0100)=0100

Table 6 below shows the values of the link VLAN bitmasks for links L1-L6 after the processing of tree 340:

TABLE 6

|  | L1 bitmask | L2 bitmask | L3 bitmask | L4 bitmask | L5 bitmask | L6 bitmask |
|---|---|---|---|---|---|---|
| Value | 1100 | 0000 | 0001 | 0101 | 1100 | 0100 |

At this point, there are no more trees for master device D1 to process. Accordingly, the algorithm will end and Table 6 represents the final, minimal set of VLAN associations for stacking system 200. Per block 420 of FIG. 4, master device D1 can subsequently send these VLAN associations to the other devices in system 200 (D2-D5) so that they can be locally assigned to the devices' respective stacking ports.

Figure 1A:
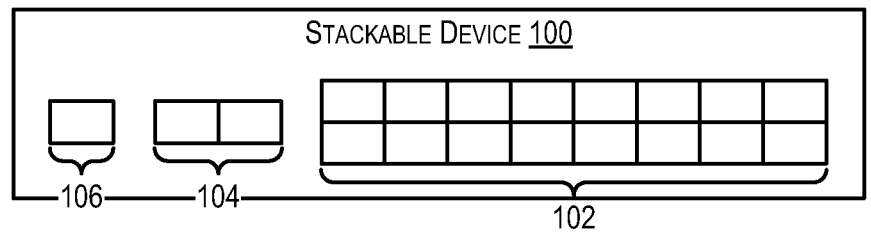
FIG. 1A depicts a stackable device according to an embodiment.
Figure 5:
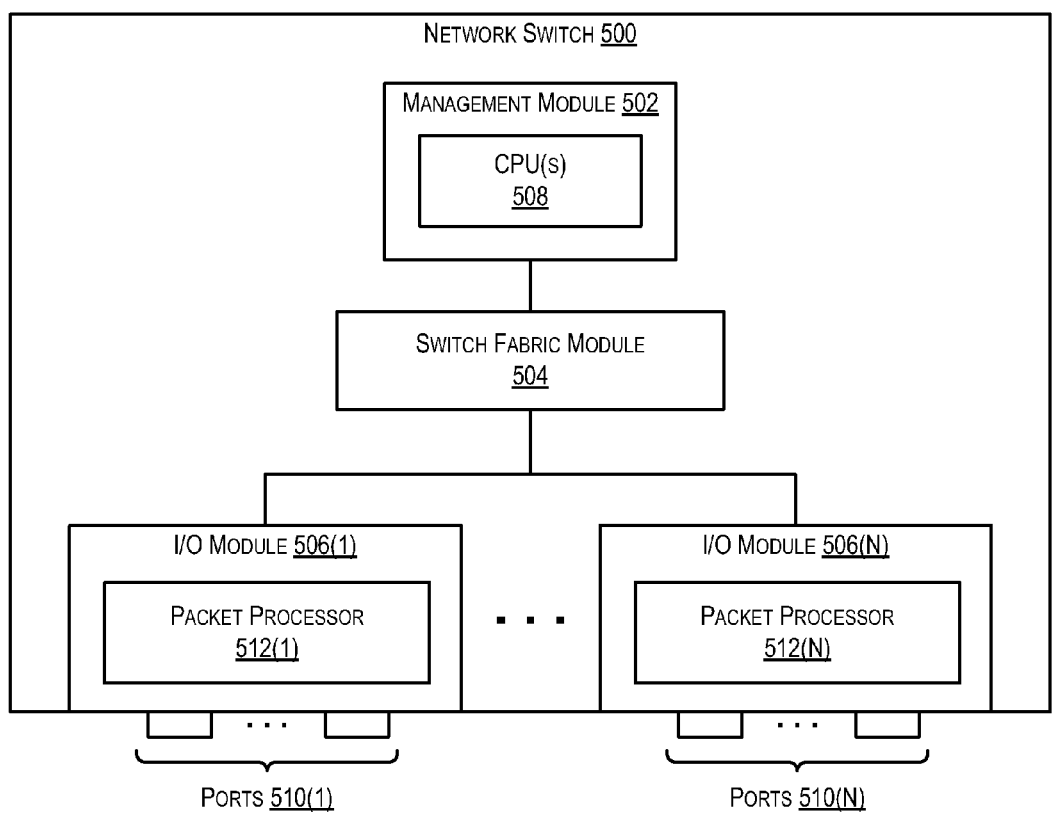
FIG. 5 depicts a network switch according to an embodiment.

FIG. 5 depicts a network switch 500 according to an embodiment. Network switch 500 can be used to implement any of the stackable devices described in the foregoing disclosure, such as stackable device 100 of FIG. 1A.

As shown, network switch 500 includes a management module 502, a switch fabric module 504, and a number of I/O modules 506(1)-506(N). Management module 502 represents the control plane of network switch 500 and thus includes one or more management CPUs 508 for managing/controlling the operation of the device. Each management CPU 508 can be a general purpose processor, such as a PowerPC, Intel, AMD, or ARM-based processor, that operates under the control of software stored in an associated memory (not shown).

Figure 1B:
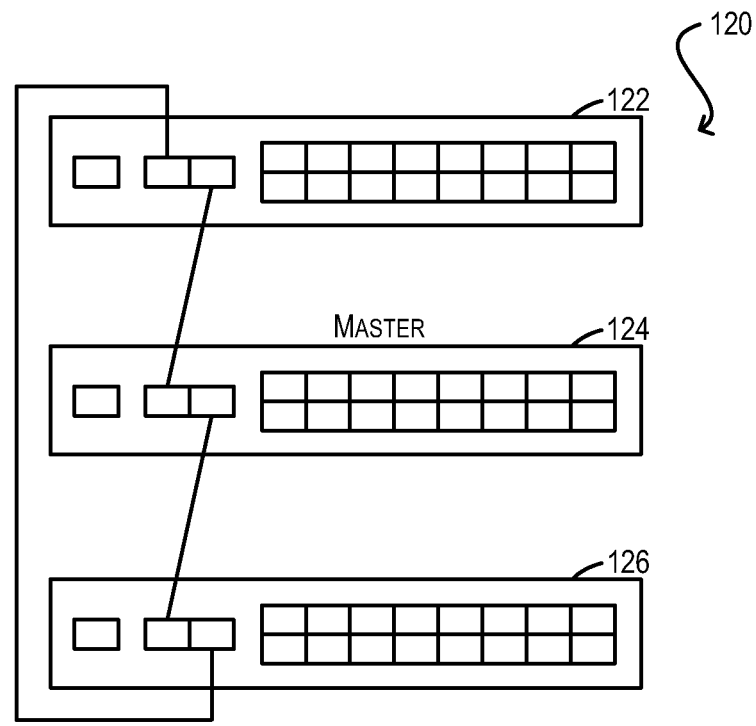
FIG. 1B depicts a stacking system according to an embodiment.
Figure 1C:
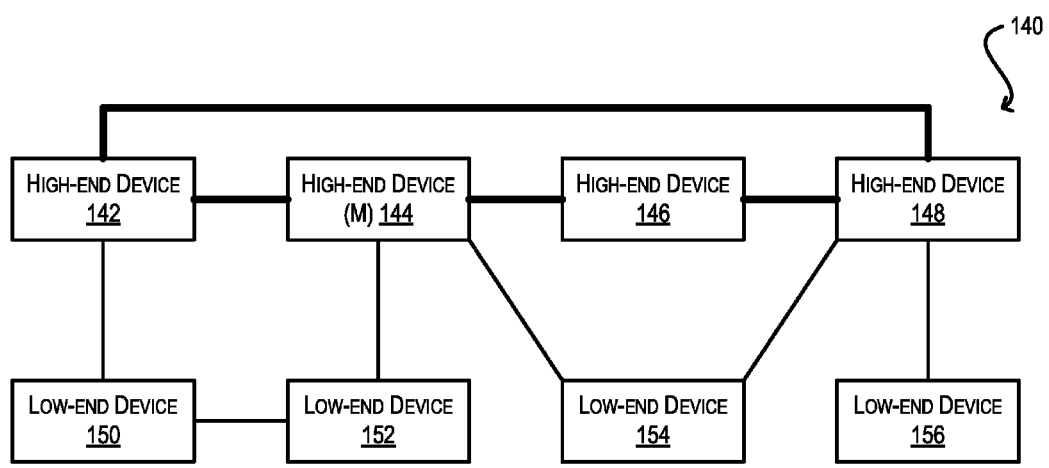
FIG. 1C depicts an advanced stacking system according to an embodiment.

Switch fabric module 504 and I/O modules 506(1)-506(N) collectively represent the data, or forwarding, plane of network switch 500. Switch fabric module 504 is configured to interconnect the various other modules of network switch 500. Each I/O module 506(1)-506(N) can include one or more input/output ports 510(1)-510(N) that are used by network switch 500 to send and receive data packets. As noted with respect to FIGS. 1A and 1B, ports 510(1)-510(N)

can comprise data ports for communicating with hosts/other network devices, as well as stacking ports for communicating with other switches in the same stacking system. Each I/O module 506(1)-506(N) can also include a packet processor 512(1)-512(N). Packet processor 512(1)-512(N) is a hardware processing component (e.g., an FPGA or ASIC) that can make wire speed decisions on how to handle incoming or outgoing data packets.

It should be appreciated that network switch 500 is illustrative and not intended to limit embodiments of the present invention. Many other configurations having more or fewer components than switch 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   determining, by a master device in a stacking system, a minimal set of virtual local area network (VLAN) associations for stacking links in the stacking system,
   wherein the determining is based on a set of single-source spanning trees calculated in view of the stacking system's topology, each single-source spanning tree defining one or more paths from a root device in the stacking system to one or more other devices in the stacking system,
   wherein the minimal set of VLAN associations avoids transmission of broadcast or multicast traffic to each device in the stacking system that does not have a data port in a VLAN associated with the broadcast or multicast traffic, and
   wherein the determining comprises:
      for each single-source spanning tree in the set of single-source spanning trees, upon determining that the root device and a non-root device of the single-source spanning tree have one or more data ports in a common VLAN, creating a VLAN association between the common VLAN and each stacking link in a path between the root device and the non-root device in the single-source spanning tree.

2. The method of claim 1 wherein the determining comprises:
   creating a device VLAN bitmask for each device in the stacking system, wherein the device VLAN bitmask identifies VLANs of which the device's data ports are members.

3. The method of claim 1 wherein the determining comprises:
   creating a link VLAN bitmask for each stacking link in the stacking system, wherein the link VLAN bitmask represents VLAN associations for the stacking link; and
   initializing each link VLAN bitmask to zero.

4. The method of claim 3 wherein the determining comprises:
   for each single-source spanning tree in the set of single-source spanning trees:
      for each non-root device in the single-source spanning tree:
         creating a common bitmask by executing a logical AND of a device VLAN bitmask for the root device of the single-source spanning tree and a device VLAN bitmask for the non-root device; and
         when the common bitmask is non-zero, walking up the single-source spanning tree from the non-root device to the root device.

5. The method of claim 4 wherein the walking comprises:
   determining when a stacking link has been traversed; and
   updating the link VLAN bitmask for the stacking link by executing a logical OR of the link VLAN bitmask and the common bitmask.

6. The method of claim 1 further comprising:
   causing VLANs to be assigned to stacking ports in the stacking system in accordance with the minimal set of VLAN associations.

7. The method of claim 1 wherein the master device re-determines the minimal set of VLAN associations when the stacking system's topology changes.

8. The method of claim 1 wherein the master device re-determines the minimal set of VLAN associations when VLAN membership of one or more data ports in the stacking system changes.

9. The method of claim 1 wherein the stacking system's topology is an arbitrary mesh-like topology.

10. The method of claim 1 wherein the stacking links comprise higher bandwidth links and lower bandwidth links.

11. A non-transitory computer readable medium having stored thereon program code executable by a processor, the program code comprising:
   code that causes the processor to determine a minimal set of virtual local area network (VLAN) associations for stacking links in a stacking system,
   wherein the determining is based on a set of single-source spanning trees calculated in view of the stacking system's topology, each single-source spanning tree defining one or more paths from a root device in the stacking system to one or more other devices in the stacking system,
   wherein the minimal set of VLAN associations avoids transmission of broadcast or multicast traffic to each device in the stacking system that does not have a data port in a VLAN associated with the broadcast or multicast traffic, and
   wherein the determining comprises:
      for each single-source spanning tree in the set of single-source spanning trees, upon determining that the root device and a non-root device of the single-source spanning tree have one or more data ports in a common VLAN, creating a VLAN association between the common VLAN and each stacking link in a path between the root device and the non-root device in the single-source spanning tree.

12. The non-transitory computer readable medium of claim 11 wherein the code that causes the processor to determine the minimal set of VLAN associations comprises:
   code that causes the processor to create a device VLAN bitmask for each device in the stacking system, wherein the device VLAN bitmask identifies VLANs of which the device's data ports are members.

13. The non-transitory computer readable medium of claim 11 wherein the code that causes the processor to determine the minimal set of VLAN associations comprises:
   code that causes the processor to create a link VLAN bitmask for each stacking link in the stacking system, wherein the link VLAN bitmask represents VLAN associations for the stacking link; and
   initialize each link VLAN bitmask to zero.

14. The non-transitory computer readable medium of claim 13 wherein the code that causes the processor to determine the minimal set of VLAN associations comprises:
   for each single-source spanning tree in the set of single-source spanning trees:
      for each non-root device in the single-source spanning tree:
         code that causes the processor to create a common bitmask by executing a logical AND of a device VLAN bitmask for the root device of the single-source spanning tree and a device VLAN bitmask for the non-root device; and
         when the common bitmask is non-zero, code that causes the processor to walk up the single-source spanning tree from the non-root device to the root device.

15. The non-transitory computer readable medium of claim 14 wherein the code that causes the processor to walk up the single-source spanning tree comprises:
   code that causes the processor to determine when a stacking link has been traversed; and
   code that causes the processor to update the link VLAN bitmask for the stacking link by executing a logical OR of the link VLAN bitmask and the common bitmask.

16. A network device comprising:
   a processor; and
   a non-transitory computer readable medium having stored thereon program code which, when executed by the processor, causes the processor to determine a minimal set of virtual local area network (VLAN) associations for stacking links in a stacking system,
   wherein the determining is based on a set of single-source spanning trees calculated in view of the stacking system's topology, each single-source spanning tree defining one or more paths from a root device in the stacking system to one or more other devices in the stacking system,
   wherein the minimal set of VLAN associations avoids transmission of broadcast or multicast traffic to each device in the stacking system that does not have a data port in a VLAN associated with the broadcast or multicast traffic, and
   wherein the determining comprises:
      for each single-source spanning tree in the set of single-source spanning trees, upon determining that the root device and a non-root device of the single-source spanning tree have one or more data ports in a common VLAN, creating a VLAN association between the common VLAN and each stacking link in a path between the root device and the non-root device in the single-source spanning tree.

17. The network device of claim 16 wherein the program code that causes the processor to determine the minimal set of VLAN associations comprises:
   code that causes the processor to create a device VLAN bitmask for each device in the stacking system, wherein the device VLAN bitmask identifies VLANs of which the device's data ports are members.

18. The network device of claim 16 wherein the program code that causes the processor to determine the minimal set of VLAN associations comprises:
   code that causes the processor to create a link VLAN bitmask for each stacking link in the stacking system, wherein the link VLAN bitmask represents VLAN associations for the stacking link; and
   initialize each link VLAN bitmask to zero.

19. The network device of claim 18 wherein the program code that causes the processor to determine the minimal set of VLAN associations comprises:
   for each single-source spanning tree in the set of single-source spanning trees:
      for each non-root device in the single-source spanning tree:
         code that causes the processor to create a common bitmask by executing a logical AND of a device VLAN bitmask for the root device of the single-source spanning tree and a device VLAN bitmask for the non-root device; and
         when the common bitmask is non-zero, code that causes the processor to walk up the single-source spanning tree from the non-root device to the root device.

20. The network device of claim 19 wherein the program code that causes the processor to walk up the single-source spanning tree comprises:
   code that causes the processor to determine when a stacking link has been traversed; and
   code that causes the processor to update the link VLAN bitmask for the stacking link by executing a logical OR of the link VLAN bitmask and the common bitmask.

* * * * *